(12) United States Patent
Rasche

(10) Patent No.: US 6,308,933 B1
(45) Date of Patent: Oct. 30, 2001

(54) SHUT-OFF-VALVE-UTILITY

(75) Inventor: Karl-Horst Rasche, Löhne (DE)

(73) Assignee: ASV Stübbe GmbH & Co. KG (DE)

( * ) Notice: Subject to any disclaimer, the term of this patent is extended or adjusted under 35 U.S.C. 154(b) by 0 days.

(21) Appl. No.: 09/478,856

(22) Filed: Jan. 7, 2000

(30) Foreign Application Priority Data

Jan. 7, 1999 (DE) .............................. 199 00 230

(51) Int. Cl.$^7$ ...................................... F16K 5/00
(52) U.S. Cl. ........................................ 251/315.1
(58) Field of Search .................. 257/315.1, 315.01, 257/315.05

(56) References Cited

U.S. PATENT DOCUMENTS 4,813,649 * 3/1989 Takeda et al. ................... 251/315
5,090,447 * 2/1992 Lewis et al. ..................... 251/315
5,553,831 * 9/1996 Ozaki et al. ..................... 251/351
5,586,749 * 12/1996 Conley et al. ................... 251/315

* cited by examiner

Primary Examiner—Kevin Shaver
Assistant Examiner—D. Austin Bonderer
(74) Attorney, Agent, or Firm—Blakely Sokoloff Taylor & Zafman

(57) ABSTRACT

A shut-off valve has a housing which is provided with a spindle bush. Located in the spindle bush is a movable spindle which is sealed with respect to the housing. The spindle is connected to a closure body disposed in the housing. The housing also has a recess, which extends around the spindle bush and is open to the interior of the housing. If the housing comes under internal pressure, the recess prevents corresponding deformation of the spindle bush. The latter can thus not become leaky under the action of the internal pressure.

8 Claims, 1 Drawing Sheet

SHUT-OFF-VALVE-UTILITY

FIELD OF THE INVENTION

The invention relates to a shut-off valve including a housing of thermoplastic plastic material, which has a spindle bush, a spindle, which is movably disposed in the spindle bush and is sealed with respect to the housing, and including a closure body, which is disposed in the housing and is connected to the spindle.

DESCRIPTION OF THE PRIOR ART

In practice, shut-off valves must in some cases withstand considerable internal pressures without leaking. If a shut-off valve is subjected to a high internal pressure, the valve housing expands radially outwardly. Shut-off valves are known whose permissible degree of deformation in operation is up to 6%. With housings of thermoplastic material, the deformation is relatively large in comparison to metallic housings. The temperature also has a major influence on the deformability of thermoplastic plastic materials, which soften at high temperatures.

Practice has shown that shut-off valves with a housing of thermoplastic plastic material tend to become leaky under high internal pressure, namely in the vicinity of the spindle bush, whereby the actuating moment also alters negatively, i.e. the ease of movement decreases. The latter can result in problems when actuating the valve.

It is thus the object of the invention to provide a shut-off valve which is reliably sealed to the exterior, even when subjected to an increased internal pressure, and is easily movably operable.

SUMMARY OF THE INVENTION

This object is solved in accordance with the invention if the housing has a recess which extends around the spindle bush and is open to the interior of the housing.

The invention is based on the recognition that the spindle bush, which is of round cross-section, deforms ovally when the valve housing deforms radially and that this is responsible for the leaks and difficulty of movement which occur.

As a result of the recess, a sleeve-shaped region is formed around the spindle guide, the cross-sectional shape of which remains substantially constant when the housing deforms. The cross-section of the spindle bush also remains correspondingly unaltered when there is an increased internal pressure in the housing. This ensures a reliable seal, even at previously critical internal pressures, on the one hand and on the other hand the spindle remains easily movable and simple to operate notwithstanding the deformation of the valve housing since no stresses occur.

Deformation of the housing could be eliminated with large concentrations of material at the critical positions on the housing. However, as changes in wall thickness become increasingly large, the risk of shrinkage cavity formation increases when manufacturing the housing. Shrinkage cavities occur when manufacturing die cast components if the heat is dissipated at differing speeds during solidification of the die cast component. This is particularly so in the case of a large concentration of material, for instance at large changes in wall thickness. Shrinkage cavities can result in destruction of the valve housing in the event of high internal pressures.

In accordance with the invention, deformation of the housing is permitted but the region of the housing which is crucial for reliably sealing, that is to say the region of the spindle bush, remains of constant shape.

An advantageous exemplary embodiment is characterised in that disposed between the spindle and the spindle bush there is at least one seal and that the recess extends in the axial direction of the spindle to at least the height of the seal.

The seal is thus located in the shape-stable region which is not affected by the deformation of the housing. It has transpired to be an additional advantage that an increased internal pressure prevailing in the recess presses this region against the spindle. As the internal pressure rises, the pressure and thus the sealing action of the seal increase also. The seal can be disposed either in an external groove in the spindle or in an internal groove in the spindle bush.

A particularly simple embodiment is produced if the seal is constructed in the form of an O-ring and if the spindle is rotatably mounted in the spindle bush. A simple, reliable and sturdy seal is thus produced. It is basically possible to construct the spindle in the form of a threaded spindle but a rotatable mounting of the spindle in the spindle bush results in a construction which is more packed and more favourable from the manufacturing point of view.

It is proposed in an important embodiment of the invention that the spindle bush is partially surrounded by a housing projection and that the recess extends into the housing projection. Such a construction has advantages, particularly from the injection moulding point of view.

Further advantageous embodiments are characterised in the dependent claims.

The invention will be described below in more detail with reference to a preferred exemplary embodiment in conjunction with the accompanying drawing.

DESCRIPTION OF THE PREFERRED EMBODIMENT

Figure 1:
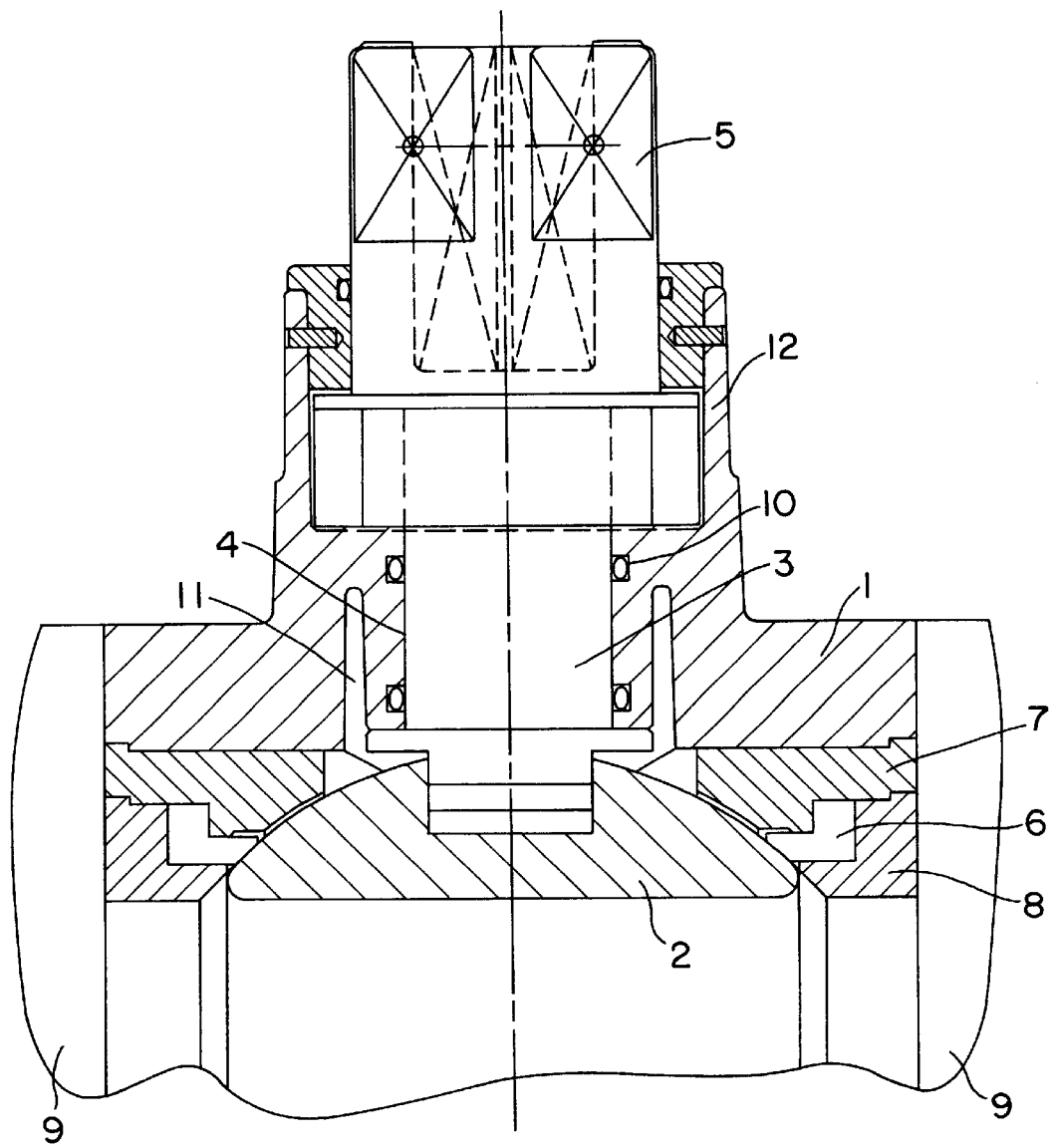
FIG. 1 is an axial sectional view of a shut-off valve in accordance with the invention, only the upper half of the valve being shown for the purpose of clarity of the invention.

The illustrated shut-off valve has a housing 1, in which a closure body 2, constructed in the form of a valve ball, is rotatably disposed. The closure body 2 is connected to a spindle 3, which is rotatably mounted in a spindle bush 4 in the housing 1. At its upper end, the spindle 3 has a coupling member for an actuating element loosely positioned on it, in the present case a spindle projection 5 of polygonal cross-section, onto which, for instance, a hand wheel or actuating handle may be placed by which the valve can be closed and opened.

The housing 1 also includes two sealing rings 6 of angular cross-section, which are each received between two clamping rings 7, 8 and the ends of whose axial limbs engage the closure body 2 for sealing purposes. The housing is provided at its inlet and outlet with spigot ends 9 (only shown schematically), which serve to connect the valve to connecting lines.

Arranged in the spindle bush 4 are two seals 10 in the form of O-rings which seal the shut-off valve with respect to the exterior.

If a high internal pressure and possibly a high temperature act on the shut-off valve, the housing 1 expands substantially in the radial direction. This resulted previously in an oval deformation of the spindle bush so that the seal no longer engaged the spindle 4 in the region of the principal axis of the oval crosssection. The shut-off valve became leaky.

However, in accordance with the present invention a recess 11 of circular annular cross-section, which is open to the interior of the housing 1, extends around the spindle bush 4. The sleeve-shaped region between the spindle 3 and the recess 11 remains of constant shape, even when the housing deforms, so that the seals 10 closely engage the spindle even under high internal pressures. The recess 11 extends in the present case into a housing projection 12.

Modifications of the described construction are of course possible within the scope of the invention. It should be stressed again that, instead of the spindle, a rotatable spindle nut may be used for receiving a threaded spindle, whereby the closure body 2 can be constructed in the form of a valve plate which seals against a valve seat when the spindle is screwed down. It is also possible to provide the spindle bush and the recess in a screw lid which is screwed onto the housing. Finally, the spindle axis can also be orientated obliquely to the flow direction of the medium conducted within the housing. Of importance, however, in all the embodiments is that the recess open to the interior of the housing extends around the spindle bush.

What is claimed is:

1. A shut-off valve including a housing of thermoplastic plastic material, which has an interior and a spindle bush extending out of the interior, a spindle, which is movably disposed in the spindle bush and is sealed with respect to the housing, and including a closure body, which is disposed in the interior of the housing and is connected to the spindle, wherein the housing has a recess, which extends around the spindle and extends into the body of the housing.

2. A shut-off valve as claimed in claim 1, wherein disposed between the spindle and the spindle bush there is at least one seal and wherein the recess extends parallel to the spindle to at least the height of the seal.

3. A shut-off valve as claimed in claim 2, wherein the seal constitutes a commercially available shaft sealing element, preferably an O-ring, and wherein the spindle is rotatably mounted in the spindle bush.

4. A shut-off valve as claimed in claim 1, wherein the spindle bush passes through a housing projection and wherein the recess extends into the housing projection.

5. A shut-off valve as claimed in claim 1, wherein the recess has a substantially circular annular cross-section.

6. A shut-off valve as claimed in claim 1, wherein the housing is of substantially cylindrical shape and wherein the spindle bush is disposed substantially radially.

7. A shut-off valve as claimed in claim 1, further comprising a sleeve-shaped region formed within the housing between said spindle bush and said recess.

8. A shut-off valve as claimed in claim 1, wherein said recess enables a cross-section of said spindle bush to remain substantially constant when an internal pressure in the housing increases.

* * * * *